United States Patent [19]

Lüdenbach et al.

[11] Patent Number: 4,516,602
[45] Date of Patent: May 14, 1985

[54] DISC VALVE

[75] Inventors: Karl Lüdenbach, Engelskirchen; Erhard Huhn, Overath, both of Fed. Rep. of Germany

[73] Assignee: Dienes Werke für Maschinenteile GmbH & Co. KG, Overath, Fed. Rep. of Germany

[21] Appl. No.: 547,567

[22] Filed: Nov. 1, 1983

[30] Foreign Application Priority Data

Nov. 6, 1982 [DE] Fed. Rep. of Germany ....... 3241050
Mar. 1, 1983 [DE] Fed. Rep. of Germany ....... 3307118

[51] Int. Cl.³ .............................................. F16K 15/14
[52] U.S. Cl. ............................ 137/512.15; 137/516.13
[58] Field of Search ...................... 137/512.15, 516.11, 137/516.13, 516.15

[56] References Cited

U.S. PATENT DOCUMENTS

| 921,892 | 5/1909 | Rogler | 137/516.13 |
| 3,903,921 | 9/1975 | Brookman | 137/516.13 |
| 4,231,394 | 11/1980 | Hrabal | 137/516.13 X |
| 4,402,342 | 9/1983 | Paget | 137/512.15 |

Primary Examiner—Robert G. Nilson
Attorney, Agent, or Firm—Berman, Aisenberg & Platt

[57] ABSTRACT

In the valve-plate of a disc-valve, frictionless guides are arranged in a balanced configuration from web center to web center, each guide situated above and between the edges of an adjacent seat-plate ring segment, so that the valve-plate is balanced against shaking movement during operation and the guides experience a balanced, and small, mechanical stress. In practice, the seat-plate and the catch-plate are pre-stressed elastically and convexly toward one another, so that the net deformation of the seat-plate during closure operation is reduced.

5 Claims, 7 Drawing Figures

DISC VALVE

BACKGROUND OF THE INVENTION

This invention starts from a disc-valve with eccentric adjustable valve-plate or disc-plate guides. The invention is concerned with disc-valves of the type wherein a circular valve-plate is formed with radial bars or webs and connecting rings, which together form circularly-shaped openings. These openings correspond to similar openings in a seat-plate and a catch-plate, as well as in any springs or damping plates. The valve-plate is guided in a frictionless manner by bow-shaped guides distributed in circumferential directions.

Known valves of this type have a central bolt which holds the free guide-arm ends between spacer washers. The thickness of the washers determines the valve-plate excursion. The guides extend from a root on the valve-plate inward in a spiral shape toward the central bolt. The bolt passes through the seat-plate, the catch-plate and the plate fittings. In this manner, the innerly arrayed, circular segment-shaped openings are crossed by seat and catch-plates through the valve-plate guides. They are therefore, partially covered and partially not covered by the separating slots of the plate, so that the separating slots are necessarily altered, thereby reducing the flow capacity. Because the guides engage within the hub area, different flow velocities of the medium in different areas of the valve plate are not preventable in practice. The disc-plate begins to shake and, consequently, the flow capacity is reduced; the reduction of flow is larger when a larger disc-plate diameter is chosen. Using known guide geometry therefore, only small and moderately sized, friction free disc-valves can be manufactured.

The guides within the hub area have only a small bend radius and a short length. Therefore, they are considerably stiff and consequently are exposed to strong torsion forces near the hub restraint. The guides therefore break at this spot too easily, if the hub restraint is not designed with a tilt linkage, which adds to the construction costs.

The object of this invention therefore is to prevent the above-named disadvantages and to permit a larger flow volume for each stroke, for a chosen valve cross-section.

SUMMARY OF THE INVENTION

Because the guides of the present invention start within the radial center area of each bar or web of the disc-shaped plate, the operational pressure differentials due to the different flow velocities of the media passed the various plate areas may be balanced out. Thus, the invention allows large friction-free disc-valves to be designed; and, in spite of the size, the shaking of the disc-plate is substantially reduced. The guide arms, being at a larger radius, are correspondingly longer and more resilient. They are also exposed to little or no torsional forces as compared with the guides of known valves of this type.

Since the guides have clearance above a ring of the seat-plate, the slots do not cross each other and the full open cross-section of the corresponding flow openings in the seat-plate, the catch-plate, and the disc-plate are not hindered by the guide, by the connection of the guide, nor by the clamping of the free linkage arms. This is because the connection and mounting bolts are positioned within the corresponding or congruent bar or web areas of seat-plate, catcher-plate, and disc-plate. The central bolt of prior disc valves can now be eliminated, so that the valve according to the present invention may, in addition, have corresponding flow openings in the center area.

In order to further enlarge the flow capacity for a given design and given operating conditions, the valve of the present invention is provided with guides which are distributed concentrically and to at least two ring areas. In this case, the excursion spacers of the radially inner clamps are of a smaller total thickness than the excursion spacers of the radially outer clamps. Thus, during the tightening of the corresponding mounting screws, the seat-plate and catch-plate deform each other somewhat elastically and convexly against each other. During the operation of the valve, the seat-plate will be arched in the opposing direction at the end of the closure stroke by the momentum of the impacting disc-plate and by the pressure which builds up in the blocked fluid media. In other words, the seat-plate would tend to be distorted with a concavity toward the catch-plate. By a proper choice of the magnitude of the pre-established stress according to the present invention, the maximum height of the convex distortion of the slot may be held at approximately the magnitude of the concave distortion, though in the opposite direction at the end of the operational closure stroke. Because of this, the seat-plate is only half as much deformed from its tension-released or "horizontal" position during the closing of the valve when compared with the total deformation distance.

Since the deformation of the seat-plate from the horizontal can not exceed a value without a loss in the integrity of the seal of the valve, the thickness of the seat-plate for prior disc valves was predetermined. With the pre-established elastic stress of the seat-plate against the catch-plate according to the present invention, the seat-plate thickness may be reduced considerably without exceeding the allowable arching dimensions. Thus, in a valve according to the present invention, the risk of damage is reduced and the flow capacity is increased. The mass of the valve seat will be smaller and will thus have a better damping affect during the closure operation.

The above advantages of a disc-valve according to the present invention may also be achieved using a center bolt whose excursion spacers have a total thickness which is kept smaller than the thickness of the excursion spacers of the guides. In this case, only one ring of guides is necessary.

Disc-plates and damper-plates having a proper dimension of the separating slots between the guides and the surrounding edges of the plates may be fabricated by stamping, water jet cutting, or erosion. The slots are preferably cut by a method involving a laser or by a combination of the above methods.

During the cutting operation by laser rays, oxygen gas is blown co-axially to the laser rays onto the burned location. In this manner, the plate material in the vicinity of the edges is cooled which prevents a coarsening of the material structure. On the other hand, the oxygen gas contributes an additional heat effect (exothermic) to the cut spot, and blows the molten material out of the newly created slot. This increases the cutting speed.

To assure sufficiently smooth edges on the slots associated with the guides, the present invention involves operating the laser in a pulsating manner. With a 500 watt $CO_2$ laser and a general thickness of the valve-plate of 2 millimeters, a cutting speed of 5 meters per minute was achieved with a roughness factor of 0.02 millimeters on the cut edge.

Thus, the present invention provides an economical and precise method for mass fabrication of valve plates, including smaller valve sizes.

BRIEF DESCRIPTION OF THE DRAWINGS

The invention is illustrated in the figures, using several specific designs, in which.

DESCRIPTION OF THE PREFERRED EMBODIMENT

Figure 1:
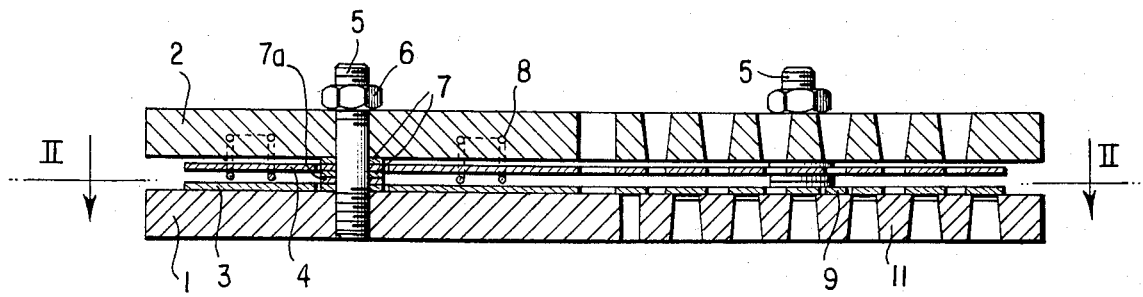
FIG. 1 is a section through the axis II from FIG. 2, the section taken through an entire valve.
Figure 2:
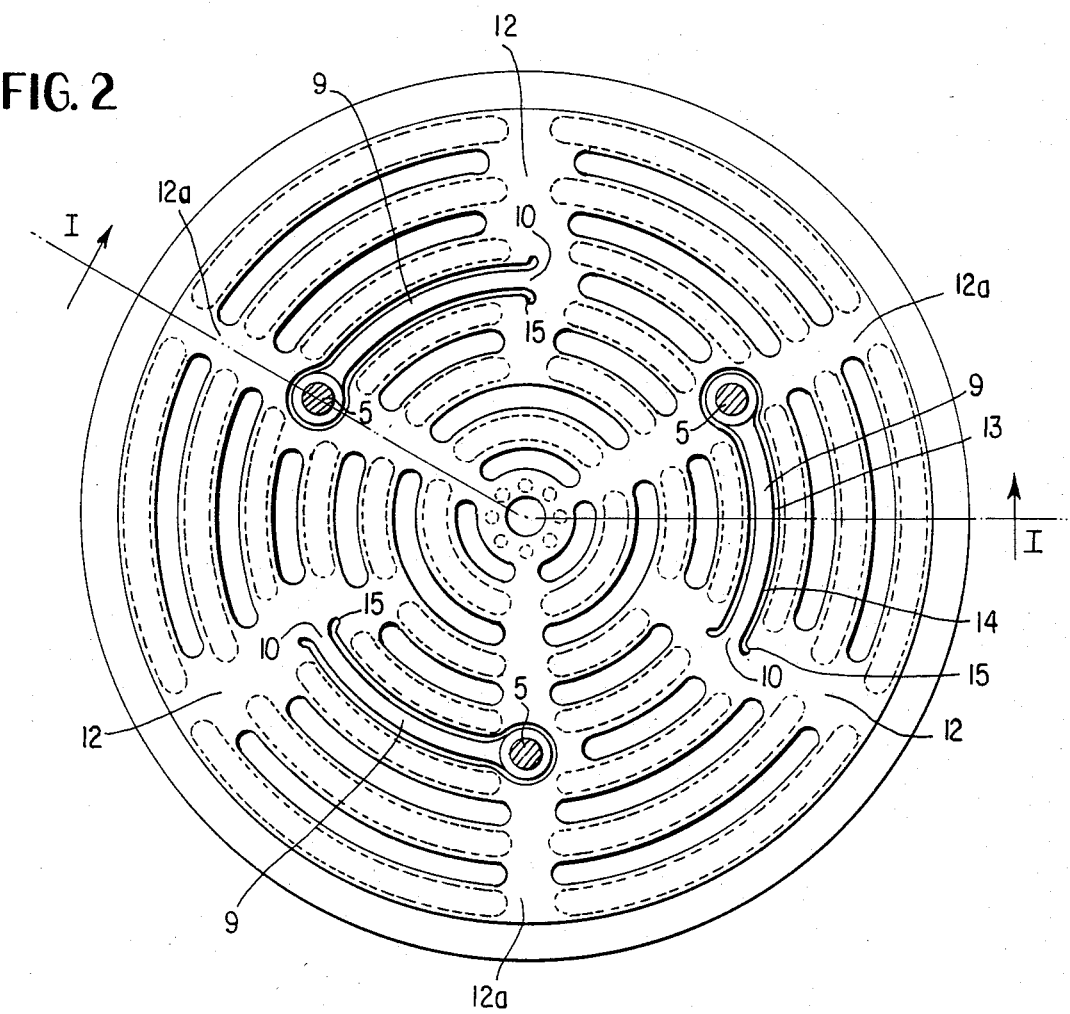
FIG. 2 is a plan view of a valve according to the present invention with the catch-plate and the damping-plate removed.
Figure 3:
FIG. 3 is a plan view of a valve-plate according to the present invention.

Referring first to FIG. 1, wherein the general characteristics of the invention are best shown, the valve-plate 3 is located in the space between a seat-plate 1 and a catch-plate 2 in the known manner. The plate is guided in a frictionless manner by bow-shaped guides 9 which increase in length according to the diameter. The fixed ends 10 of the guides 9 are flanked by rounded clearances 15 which are cut into the middle of the web 12 of the valve-plate 3. The guides, such as 9 are aligned above a ring 11 of the seat-plate 1. Each guide is provided at its free end with a clamping ring 7a (best seen in FIG. 2) which, together with other excursion spacers 7, surrounds a mounting bolt 5. The mounting bolts, such as 5, pass through a web 12a. The opening edges 14 in the valve plate 3 surround the guides such as 9 with a clearance 13. They are positioned above and between the edges of the adjacent seat-ring 11. The valve-plate 3 is supplied with pressure by means of spiral springs 8, shown in closed position, and located within the catch-plate 2.

The illustrated embodiment is provided with another, known damping-plate 4 which is designed and arranged congruently to the valve-plate 3. The guide of the damping-plate is fixed to the mounting bolt 5 between the excursion spacers 7 in like manner to the guide 9 of valve-plate 3. Large valve-plates and damping-plates may have several such guides arranged concentrically and distributed over several ring areas.

Figure 4:
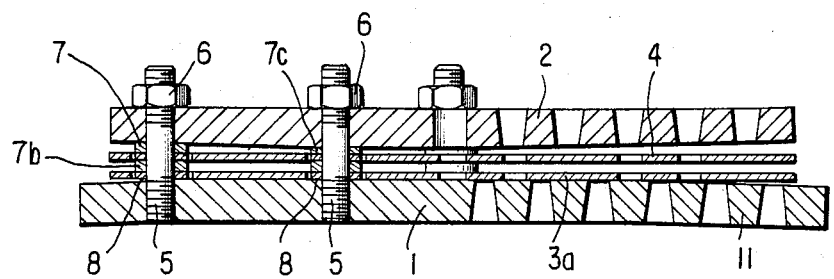
FIG. 4 is an axial cross-section in the plane IV from FIG. 5, an embodiment of the valve in a pre-stressed seat-plate and catch-plate configuration.
Figure 5:
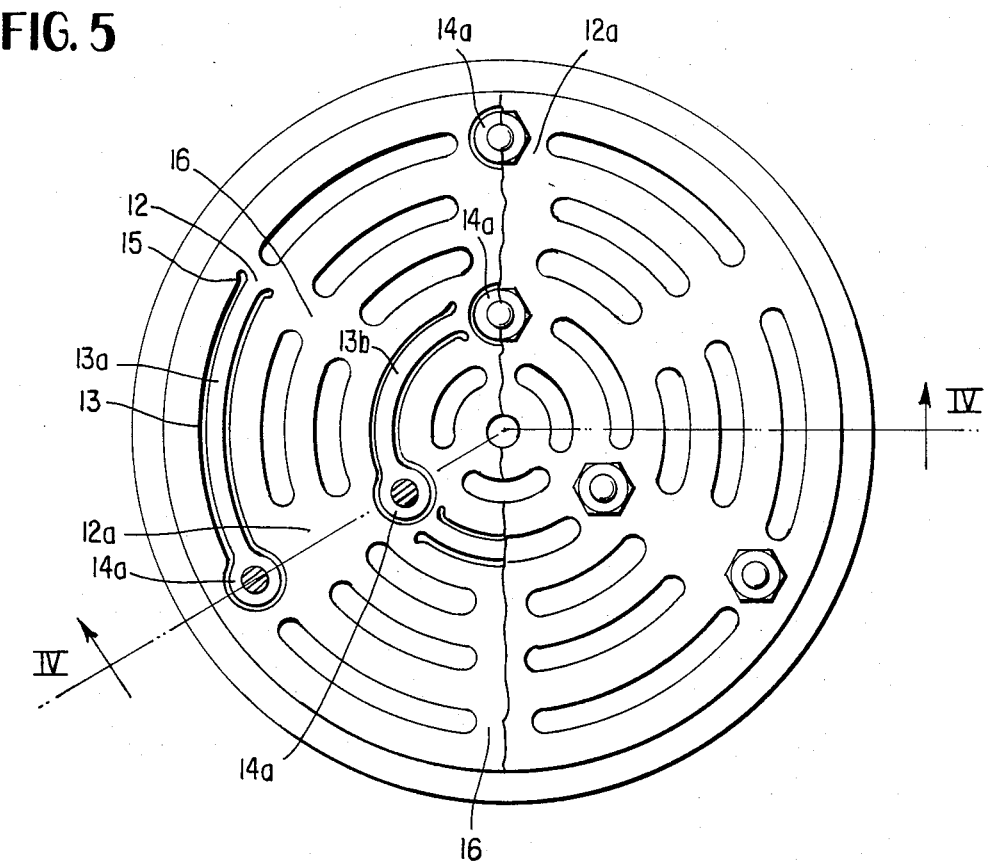
FIG. 5 is a plan view of the valve of FIG. 4 partially cut away.

The embodiment shown in FIGS. 4 and 5, which is particularly adapted for large valve-plates and large damping-plates, is provided with two sets of concentric guides exemplified by the guides 13a and 13b which are contained within the radial sector which encompasses webs 12 12a. In this embodiment, the excursion spacers 7c of the radially inner guide clamping devices, such as 13b, are of less total thickness than the excursion spacers 7b of the radially outer guide clamping devices, such as 13a.

Figure 6:
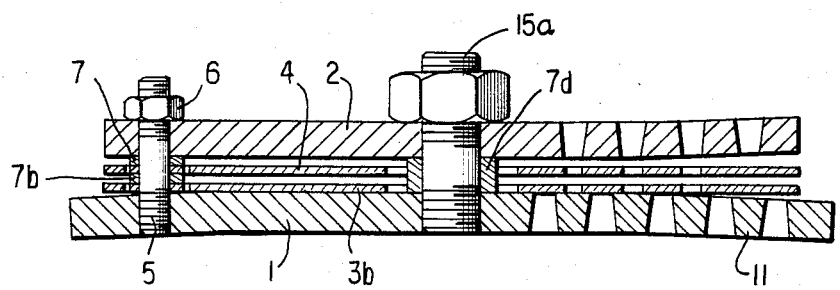
FIG. 6 is a section in plane VI from FIG. 7 of an alternative embodiment having oppositely pre-stressed seat-plate and catch-plate.
Figure 7:
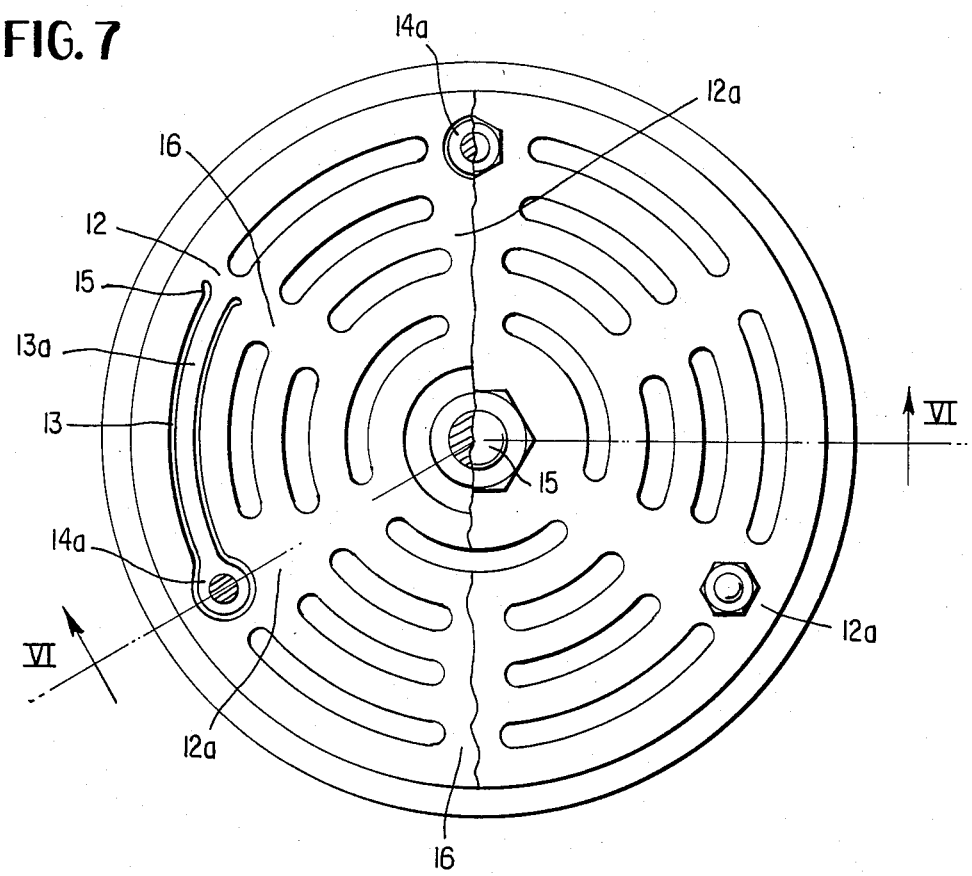
FIG. 7 is a plan view of the valve of FIG. 6 partially cut away.

In the embodiment of FIGS. 6 and 7, a central bolt 15a is provided whose excursion spacers 7d have less thickness than the excursion spacers 7b of the guide ring bolts, such as 6.

In both of the latter two embodiments an elastic, convex pre-stress is achieved between the seat-plate and the catch-plate. The magnitude of the pre-stress is exaggerated in the figures for clarity. In valves such as those shown, with a seat-plate outside diameter of 125 millimeters, the seat-plate may normally be allowed to arch or distort outwardly by approximately 0.07 millimeters maximum from the plane, or "horizontal" position of the seat. This might occur under the highest load on the pressure side of approximately 40 bars, at the end of a stroke. Under these conditions, the valve will still close tightly. The extent of the opposing elastic pre-stress of the seat-plate and the catch-plate in the latter two embodiments is also about 0.07 millimeters. Therefore, the seat-plate may in effect be allowed to be deflected at the end of the closure stroke by a total of about 0.14 millimeters. Consequently, it may be designed less thickly, and therefore with less material. This results in material savings of 56% in the illustrated embodiments for the seat-plate, and a reduction of the space for the valve of approximately 69%. The reduced mass also results in a better damping affect when the valve-plate impacts against the seat-plate. This improved damping affect in the valve closure stroke permits the operation of the valve in piston machines at higher RPM's, which means a further increase in flow capacity for a given outside diameter of the valve. The seat-plate area should be milled in relaxed condition, to a planeness of 0.01 millimeters by use of a plane grinding machine.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A disc-valve of the type having a circular valve-plate disposed between a seat-plate and a catch-plate in which the valve-plate comprises a plurality of radial webs which are connected by ring segments to form circular segment-shaped flow openings which correspond to ring segments and openings in the seat-plate, in the catch-plate, and in any spring-or damping-plates, the disc-valve distinguished by the fact that:

the valve plate is guided by a plurality of bow-shaped guides, each guide extending in a circumferential path from a first of said webs to a second of said webs, each guide shaped by a clearance from the valve-plate and having a fixed end and a free end, each fixed end flanked by a rounded extra clearance in the middle of its respective first web whereby each guide has clearance at least above one ring segment of the seat-plate; the free end of each guide forming a clamping ring which surrounds a mounting bolt and is held in position by a plurality of excursion spacers, said mounting bolt passing through the respective second web associated with the guide, the guide so configured that the edges of the surrounding clearance are positioned above and between the edges of the adjacent ring segment of the seat-plate.

2. A disc-valve as recited in claim 1, wherein the guides are distributed over at least two concentric seat-plate ring segments at different radial distances from the center of the disc-valve, and wherein the excursion spacers of the radially inner guides are of smaller total thickness than the excursion spacers of the radially outer guides.

3. Disc-valve as recited in claim 1, wherein the seat-plate and the catcher-plate are joined by a central bolt, the excursion spacers surrounding the central bolt being of a total thickness smaller than the excursion spacers associated with the guides.

4. A disc-valve according to claim 1 wherein said clearance is provided by cutting away material forming said valve plate with a pulsating laser beam.

5. A disc valve according to claim 1 wherein each of said guides extends from a central portion of said first web to a central portion of said second web and wherein each of said guides is aligned with a respective adjacent ring.

* * * * *